(No Model.) 2 Sheets—Sheet 1.
J. S. MILLER.
BAND SAW MILL.
No. 327,574. Patented Oct. 6, 1885.
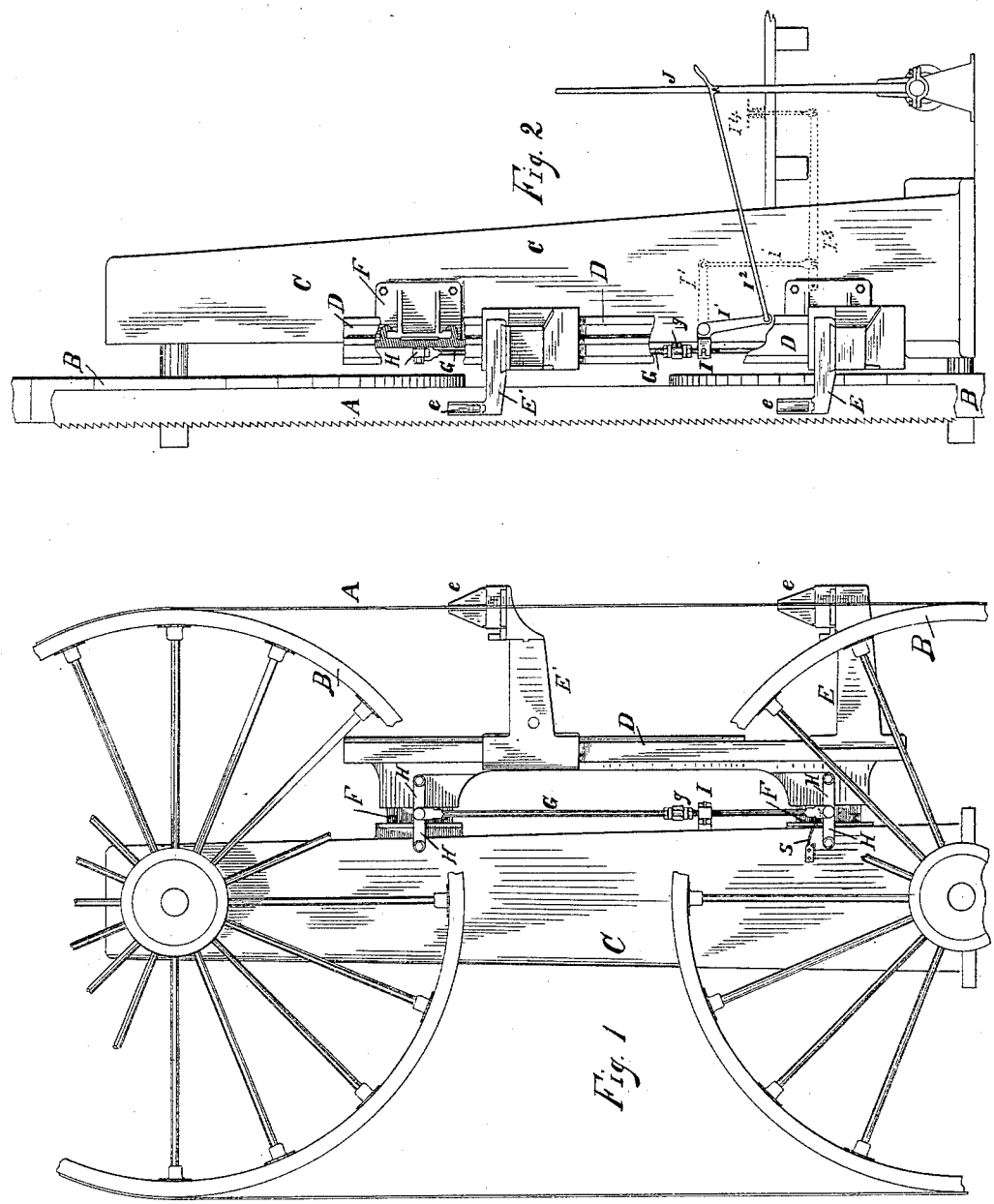
Attest.
L. D. Hanford
F. T. Chapman.
Inventor
Jas. S. Miller
Per. Hallock & Hallock
Att's.

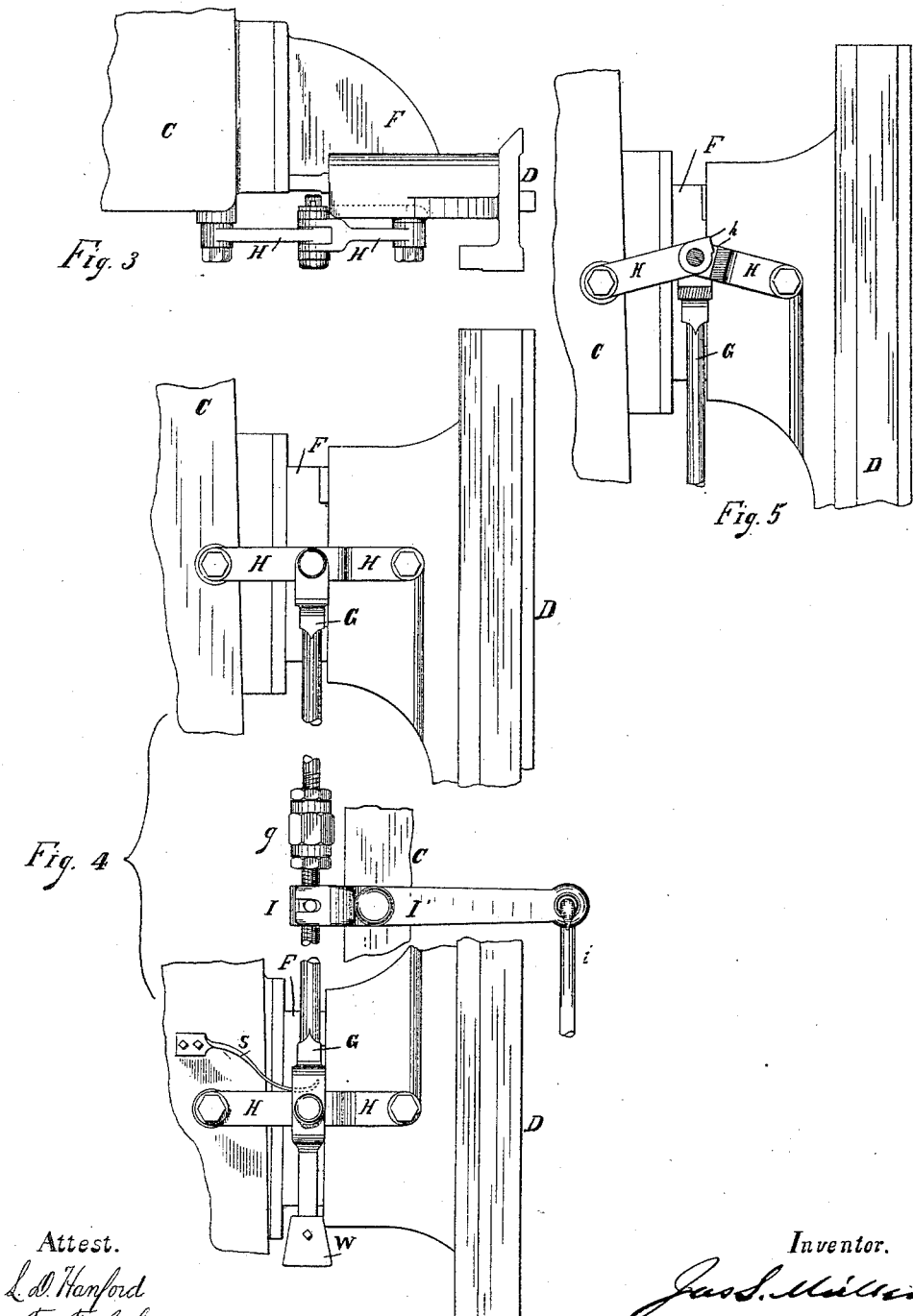

UNITED STATES PATENT OFFICE.

JAMES S. MILLER, OF ERIE, PENNSYLVANIA, ASSIGNOR TO THE STEARNS MANUFACTURING COMPANY, OF SAME PLACE.

BAND-SAW MILL.

SPECIFICATION forming part of Letters Patent No. 327,574, dated October 6, 1885.

Application filed July 27, 1885. Serial No. 172,788. (No model.)

*To all whom it may concern:*

Be it known that I, JAMES S. MILLER, a citizen of the United States, residing at Erie, in the county of Erie and State of Pennsylvania, have invented certain new and useful Improvements in Band-Saw Saw-Mills; and I do hereby declare the following to be a full, clear, and exact description of the invention, such as will enable others skilled in the art to which it appertains to make and use the same.

This invention relates to that class of saw-mills in which a band-saw is used; and it consists in certain improvements in the means for guiding the saw, as will be hereinafter fully set forth and claimed.

In the class of saw-mills above named it is necessary to either move the log away from the saw or the saw away from the log when the carriage is being backed up for a new cut, which movement of the carriage is known as "gigging." To this end devices have been provided both for moving the log or the carriage to one side of the saw-line when it is gigged, and for moving the saw away from the log.

My invention consists in certain improvements upon devices for moving the saw away from the log, and it is illustrated in the accompanying drawings, and will be hereinafter fully described, and pointed out in the subjoined claims.

The accompanying drawings illustrate my invention as follows: Figure 1 is a front elevation of a band-saw saw-mill frame, and shows the main post C, band-wheels B B, band-saw A, saw-guides E E', guide-column D, and guide-column ways F F, all of which are constructed as commonly, and also shows my device for moving the guide-column D on the ways F F, which consists of the toggle-levers H H and H H, the rod G, connecting said toggles, and means for moving said rod G—viz., the lifter I. Fig. 2 is a side elevation of the same parts shown in Fig. 1, and shows, further, the means for moving the lifter I, which are the lever I', the connecting-rod I², and the gig-lever J, or, as shown by dotted lines, the levers I' and I³, the treadle I⁴, and the link *i*. Fig. 3 is a top view of the main post or column C, guide-column D, guide-column ways F, and the toggles H H. Fig. 4 shows fragments of the same parts seen in Figs. 1 and 2 enlarged. Fig. 5 shows the internal construction of the joint of the toggles H H.

It will be understood that the guide-column D, which carries the saw-guide arms E E', is movable laterally on the ways F F, and when moved the saw is brought into or out of line, as the case may be.

In Fig. 1 the saw is shown in line. When the log is being gigged, the saw should be out of line, so as not to scour on the side of the log or cant, and it is deflected out of line by moving the guide-column in toward the main post C, and when the log is ready to move forward again for another cut the guide-column is moved out from the post into the position shown.

It is of very great importance that the device for moving the guide-column shall always move it out so as to accurately bring the saw into line. The devices heretofore used to move the guide-column D often fail to move it out to the proper point, and to overcome this defect is the object of my invention. I accomplish this object by using toggles H H and H H with rule-joints *h*. (See Fig. 5.) The toggles, by reason of their powerful leverage, make the operation of moving the guide-column easy, and the joints of the toggles being made with shoulders *h* to abut when the toggles are in line, which formation is generally known as a "rule-joint," the limit of motion is certain. I connect the two toggles, the one at the top and the other at the bottom, by a rod, G, which has a coupler-nut, *g*, to insure perfect adjustment of the length of the rod.

The lifter I is secured on the rod, and is provided on each side with trunnions, and the lifting-lever I' is forked and embraces the lifter I, and each fork is notched to embrace the trunnions.

The movement of the toggles out of line may be opposed by a spring or a weight, or both, which will return them into line as soon as the force which moved them out of line is removed. I have shown a spring, S, and a weight, W, both applied.

It is common to connect the devices which move the guide-column with the gigging-lever, so that the saw will be sure to be deflected out of line when the carriage is gigged. I have shown in Fig. 2 in full lines such a connection applied to my improved devices for actuating the guide-column. I have in the same figure shown by dotted lines a treadle, I$^4$, by the side of the gigging-lever, which is connected by the lever I$^3$ and link $i$ with the lifting-lever I. By treading on the treadle I$^4$ the saw will be deflected, and the treadle is placed where the operator would place his foot to draw back the gigging-lever, and thus the operation of moving the gigging-lever and deflecting the saw will be done at the same time.

The essential features of my invention are the toggles and the rod connecting them together so they will move simultaneously. The means for moving the toggles may be varied, and may be applied to the rod, as shown, or to one of the toggles.

The second essential feature is, that the said toggles be made with a stop in the joint or elsewhere, so that when they are in line they can only be moved out of line in one direction.

What I claim as new is—

1. In a band-saw saw-mill, the combination, substantially as described, of a laterally-movable part which guides the saw-toggles H H and H H, connecting said laterally-movable part with a fixed part of the frame, and a rod connecting said toggles so they will move simultaneously.

2. In a band-saw saw-mill, the combination, substantially as set forth, of the post C, the guide-column D, mounted and movable on the ways F, which extend from said post, the toggles H H and H H, connecting said guide-column with said post, the rod G, connecting said toggles so they will move simultaneously, and the lever I′, for moving said rod.

3. In a band-saw saw-mill, the combination, substantially as set forth, of the main post C, having ways F F extending therefrom, the guide-column D, mounted on said ways, toggles H H and H H, connecting said guide-column with said post, the rod G, connecting said toggles so they will move simultaneously, and the levers I′ I$^3$, link $i$, and treadle I$^4$, for moving said rod G.

In testimony whereof I affix my signature in presence of two witnesses.

JAMES S. MILLER.

Witnesses:
  W. T. BROWN,
  ROBT. H. PORTER.